United States Patent
Shan

(10) Patent No.: US 7,409,156 B2
(45) Date of Patent: Aug. 5, 2008

(54) SYSTEM AND METHOD FOR A SUPERVISORY SIGNAL MODULATION SCHEME USING VARIABLE OPTICAL ATTENUATORS

(75) Inventor: Xuekang Shan, Welling Kent (GB)

(73) Assignee: Alcatel, Paris (FR)

( * ) Notice: Subject to any disclaimer, the term of this patent is extended or adjusted under 35 U.S.C. 154(b) by 547 days.

(21) Appl. No.: 10/968,888

(22) Filed: Oct. 21, 2004

(65) Prior Publication Data

US 2005/0089325 A1    Apr. 28, 2005

(30) Foreign Application Priority Data

Oct. 22, 2003    (GB)    .................. 0324586.7

(51) Int. Cl.
*H04B 10/08* (2006.01)
*H04B 17/00* (2006.01)

(52) U.S. Cl. ........................................ 398/30
(58) Field of Classification Search ............ 398/30
See application file for complete search history.

(56) References Cited

U.S. PATENT DOCUMENTS 5,790,289 A    8/1998    Taga et al.

2003/0198469 A1*  10/2003  Bisson et al. ............... 398/33
2005/0078351 A1*  4/2005  Avallone et al. ............ 359/334

FOREIGN PATENT DOCUMENTS

| EP | 1 322 052 A2 | 6/2003 |
|---|---|---|
| JP | 8-321824 | 12/1996 |
| JP | 2003-204306 | 7/2003 |
| WO | WO 02/089366 A1 | 11/2002 |

\* cited by examiner

*Primary Examiner*—Shi K. Li
*Assistant Examiner*—Quan-Zhen Wang
(74) *Attorney, Agent, or Firm*—Sughrue Mion, PLLC

(57) ABSTRACT

System and method for supervisory signal modulation on Wavelength Division Multiplex (WDM) channels wherein variable optical attenuators (VOAs) are used for amplitude modulation of the supervisory signal. Alternatively, at least two spectral bands of the supervisory signal are amplitude modulated by means of VOAs at a same frequency but in phase difference, preferably in anti-phase such that the signal resulting from the combination of the two spectral bands is maintained at a predetermined value, preferably at a minimum value and more preferably at zero value.

11 Claims, 2 Drawing Sheets

SYSTEM AND METHOD FOR A SUPERVISORY SIGNAL MODULATION SCHEME USING VARIABLE OPTICAL ATTENUATORS

This application is based on and claims the benefit of UK Patent Application No. GB 0324586.7 filed Oct. 22, 2003, which is incorporated by reference herein.

The present invention relates to submarine telecommunication systems wherein Wavelength Division Multiplex (WDM) techniques are used. Currently supervisory signaling to and from the submerged plant devices in submarine optical transmission systems is achieved by periodic amplitude modulation of the transmitted WDM line signal. This modulation is in the frequency range of a few tens of kHz to a few hundreds of kHz, and constitutes a subcarrier with a frequency out of the range corresponding to the transmitted traffic signal carried in each individual wavelength of the WDM wavelength comb. It is on this subcarrier that the digital supervisory signaling is carried. The amplitude modulation index of supervisory modulation is normally no more than 20%.

More particularly the present invention relates to a new scheme for supervisory signal modulation on Wavelength Division Multiplex (WDM) channels based on use of variable optical attenuators (VOAs). In an alternative embodiment of the invention, two VOAs are used to amplitude modulate the optical power at two different spectral areas of the signal spectrum. Preferably one VOA is located in the trunk line and the other is placed in a branch line when a branching unit is used. According to this alternative embodiment, the supervisory signal is modulated by amplitude modulating said VOAs in phase difference, preferably in anti-phase, as will be described in more detail further below.

BACKGROUND OF THE INVENTION

A known way of performing modulation of the supervisory signal on WDM channels is by using Raman gain. However as Raman amplification is not flat over C band (1520-1570 nm) or L band (1570-1610 nm), it is difficult to achieve uniform modulation over all WDM channels.

When Raman gain is used, a relatively high power pump laser emitting at a wavelength of about 1455 nm, two 1455/1550 WDM couplers and about 4 km of NDSF (Non-Dispersion-Shifted Fiber) are needed, making the supervisory modulator expensive, bulky and lossy with insertion loss in the range of for example 3 to 4 dB.

On the other hand, in cases where a WDM branching unit is present in the submerged plant, optical Erbium-doped fiber amplifiers (EDFA) are conventionally used for overcoming losses in the branching unit caused by passive optical components and for balancing the relative optical power values between the straight-through channels and the channels added in the trunk line. Furthermore, optical amplifiers provide the capability of supervisory return signaling necessary for sending management information from the branching unit to a terminal station.

However, optical amplifiers add cost, noise, complexity and volume, while worsening the reliability of the operation and creating manufacturability problems for the branching unit.

It is therefore desired to obtain an efficient and cost effective scheme of supervisory modulation without the need for using Raman modulation or optical amplifiers thus avoiding the drawbacks mentioned above.

DESCRIPTION OF THE INVENTION

The above objective is reached by using the solution proposed by the present invention.

Accordingly, an object of the present invention is that of providing a system and a method for superimposing a supervisory signal modulation on a transmitted WDM line signal using at least one variable optical attenuator (VOA).

According to one aspect of the present invention, a VOA is used to amplitude modulate the optical power of the whole WDM signal in the transmission line terminal with supervisory signal before the WDM signal is launched into the trunk line.

According to another aspect of the present invention, at least two VOAs are used to amplitude modulate the optical power at two different spectral areas of the signal spectrum.

The terms spectral area, or spectral band, refer to a group of multiplexed wavelength channels. According to the invention, the two spectral areas are modulated at the same frequency and in phase difference such that the resulting modulation amplitude of the total signal power is maintained at a minimum value.

According to still another aspect of the present invention, said minimum value of the modulation amplitude is zero.

According to a further aspect of the present invention, one of said at least two VOAs is in the trunk line and another is in a branching line of a branch unit.

It is worth noting that, in practice, the presence of VOAs in a WDM branching unit that does not include optical amplifiers is required in order to achieve the balancing of the relative optical power values between the straight-through channels and the channels added in the trunk line from the branch. The invention takes advantage of this requirement in the implementation of the present embodiment.

The above and further advantages of the present invention are explained in more detail in the following description as well as in the claims with the aid of the accompanying drawings.

EXAMPLES OF PREFERRED EMBODIMENTS

As it is known in the related art, variable optical attenuators (VOAs) are used in order to adjust the level of the optical power of optical signal. There are various types of VOAs available in the market which can be used for the purposes of the present invention. As a few examples, there are VOAs based on Micro-Electro-Mechanical Systems (MEMS) technology, on Diffractive MEMS (DMEMS) technology, and on Faraday rotation effect in optical crystals.

The basic functionality of a VOA is to provide optical attenuation to an optical signal, and the amount of the attenuation is controlled by an electrical signal. For the purpose of the first embodiment of the present invention, any conventional VOA having the following known characteristics may be used: low insertion loss, low polarization dependent loss, low wavelength dependent loss, low polarization mode dispersion, high frequency response speed or, equivalently, short modulation response time-constant (of the order of microseconds), low temperature drift, and high reliability.

At present, relatively fast VOAs, with response time of the order of microseconds are commercially available and are typically based on diffractive MEMS technology. These VOAs have relatively low insertion loss, i.e. below 1 dB, relatively low polarization dependent loss (PDL) of about 0.2 dB approximately, and low wavelength dependence.

When this type of VOA is used as supervisory signal modulator, the modulation depth has negligible wavelength dependence, and the insertion loss could still remain as low as about 2 dB. Also the overall structure of the modulator can become very compact as the VOA is about 1 Cm in diameter and 3 Cm in length. This type of VOAs have also a relatively low price.

Furthermore, VOAs may be used for adjusting gain tilt in the post amplification stage. Therefore if a VOA is chosen for this stage, then it may also be used as a modulator of the supervisory signal, thus leading to further reduction in the number of components and the physical size of the overall modulator.

Figure 1A:
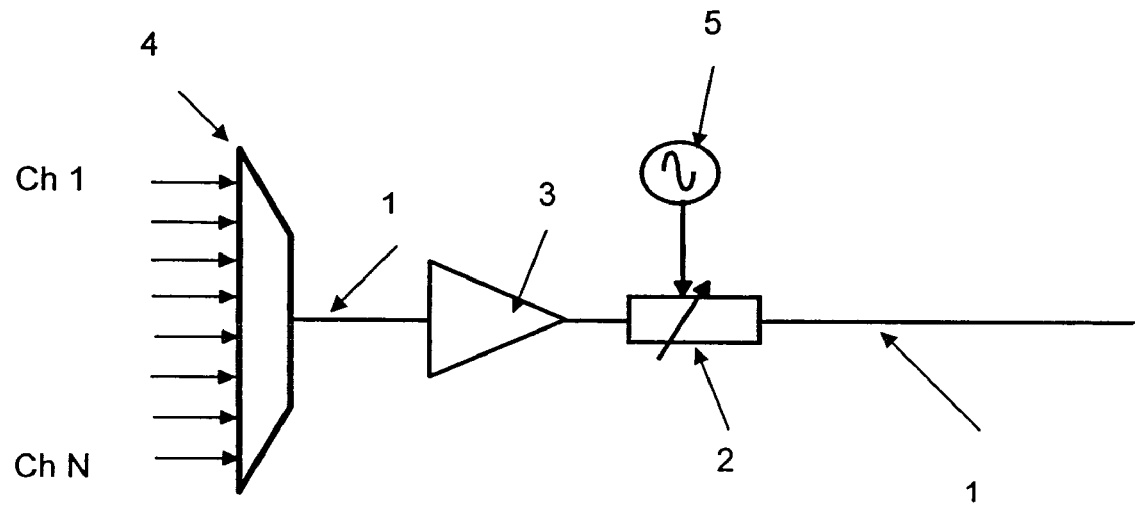
FIG. 1a is a schematic representation of a first embodiment of the invention wherein one VOA is used in a submarine optical transmission trunk line in order to superimpose a supervisory signal modulation on the whole WDM signal.

Referring now to FIG. 1a, there is provided a schematic representation of a first embodiment of the invention wherein an optical submarine transmission line 1 is shown capable of transmitting optical signals between a first and a second terminal (not shown). In the example shown in the figure, optical channels $Ch_1, \ldots, Ch_N$ are multiplexed in a WDM multiplexer 4 thus generating a WDM optical signal which is fed into an optical amplifier 3, for example an EDFA. The amplified signal generated at the output of the optical amplifier 3 is input into a VOA shown by reference numeral 2. A supervisory signal generator 5 generates a supervisory signal in a known manner and feeds said supervisory signal into the same VOA, 2. The VOA, 2 then superimposes the supervisory signal received from the supervisory signal generator 5 on the WDM optical signal received from the optical amplifier 3 and amplitude modulates the combined signal which is then transmitted from the output of the VOA, 2 on the optical transmission line 1. As stated above, VOAs may conventionally be used for adjusting gain tilt in the post amplification stage. Advantage may therefore be taken from this application of a VOA in this stage in order to also use it as a modulator of the supervisory signal. This option thus leads to further reduction in the number of components and the physical size of the overall modulator.

Figure 1B:
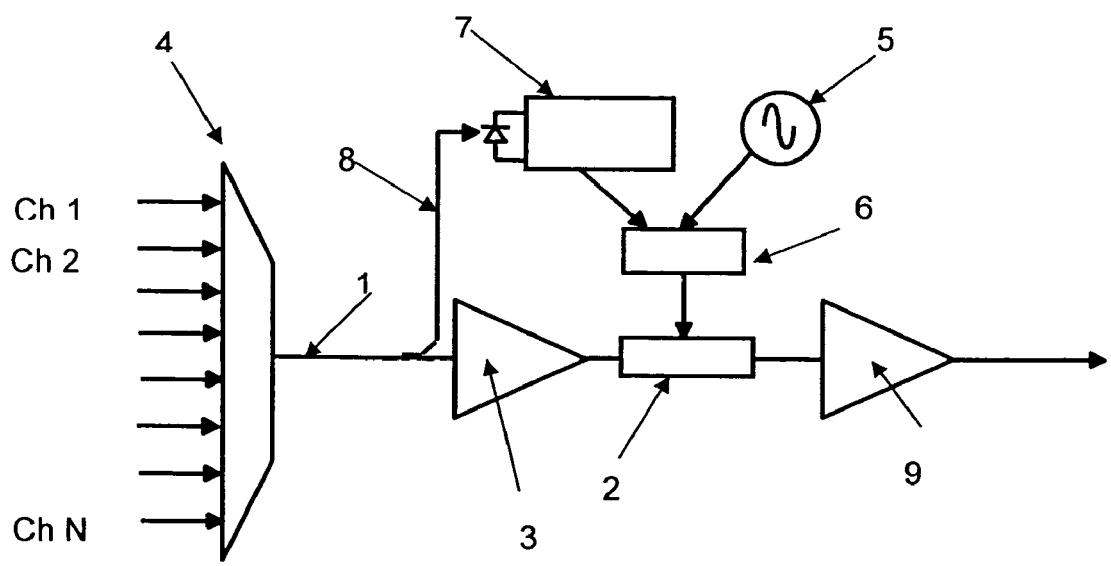
FIG. 1b is a schematic representation of a variation in implementation of the first embodiment of the invention wherein one VOA is used between two optical amplifier stages both to control the optical amplifier gain tilt and to superimpose a supervisory modulation on the whole WDM signal.

FIG. 1b illustrates an implementation of the above idea. In this figure, there is provided a schematic representation of the first embodiment of the invention as in FIG. 1 with the difference that the VOA is used between two optical amplifier stages in order to, on the one hand, control the optical amplifier gain tilt and on the other, superimpose a supervisory modulation on the whole WDM signal.

In FIG. 1b wherein like elements are represented by like reference numerals as in FIG. 1a, an optical submarine transmission line 1 is shown capable of transmitting optical signals. As already described in relation to FIG. 1a, optical channels $Ch_1, \ldots, Ch_N$ are multiplexed in a WDM multiplexer 4 thus generating a WDM optical signal which is fed into an optical amplifier 3, for example an EDFA. The amplified signal generated at the output of the optical amplifier 3 is input into a VOA, 2. Also as discussed above, a supervisory signal generator 5 is used to generate a supervisory signal in a known manner.

In order to control and adjust the gain of the optical amplifier 3, a portion 8 of the WDM signal is coupled from the input of the optical amplifier 3 to an optical amplifier gain tilt control unit 7, the latter generating a control signal.

The resulting control signal is then fed from the optical amplifier gain control unit 7 into an adder 6 which adds the control signal to the supervisory signal generated by the supervisory signal generator 5 as discussed above. The resulting added signal is output from the adder 6 and fed into the VOA, 2, which is in charge of superimposing the signal received from the adder 6 which contains the supervisory signal, on the WDM optical signal received from the optical amplifier 3 and amplitude modulates the combined signal. The combined signal is input into a second optical amplifier 9 which is amplified and then transmitted on the optical transmission line 1.

In an alternative embodiment of the present invention, two VOAs are used in such a way that a first spectral band of the supervisory signal is amplitude modulated by means of a first VOA and a second spectral band of the supervisory signal is amplitude modulated by a second VOA. In the arrangement of this alternative embodiment, as will be described in further detail below, there is no need for use of optical amplifiers. Nevertheless, the arrangement still provides the capability of supervisory return signaling.

Preferably, supervisory signaling can be implemented by using VOAs embedded in a branching unit. This can provide supervisory response at low supervisory signal carrier frequencies, which would otherwise be severely attenuated by the high-pass frequency characteristic of the trunk transmission line EDFAs. This feature is useful because most commercially available VOAs have a low-pass filter response, which is considerably lower than the supervisory signaling frequency used in current high-signal power WDM transmission systems.

In this embodiment, advantage is taken of the fact that the signal power amplitude can be modulated by modulating the attenuation of a VOA. However, most commercial VOAs, and in particular VOAs suitable for use in the submerged plant of a submarine transmission system, cannot be effectively modulated at frequencies higher than 10 kHz. Such low frequency modulation will be severely attenuated as it traverses the high-power Erbium-doped fiber amplifiers present on the trunk line. Therefore, depending on the distance of the branching unit from the terminal stations, the transmitted supervisory information may reach the terminals in an unrecoverable condition.

In the implementation of this embodiment of the invention use may be made of conventional VOAs with small frequency response bandwidth or, equivalently, a long modulation response time-constant (of the order of several tens of microseconds to about a millisecond or more).

Figure 2:
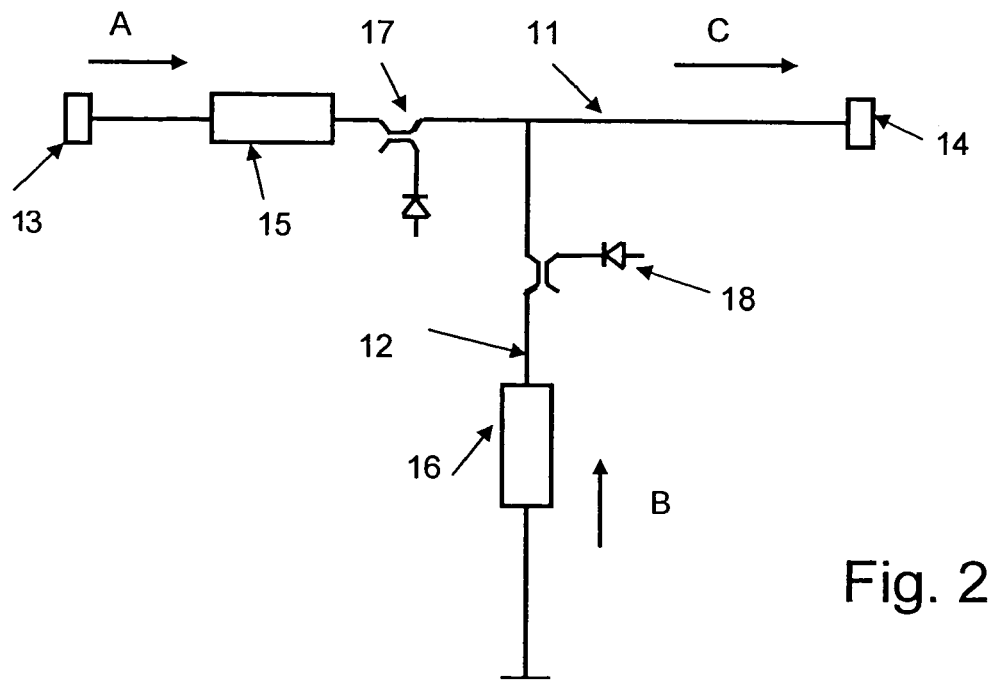
FIG. 2 is a schematic representation of an alternative embodiment of the invention wherein two VOAs are used, one in a submarine optical transmission line (trunk) and another in a branch line of a branching unit in order to modulate a supervisory signal traveling in said transmission line.

Referring now to FIG. 2, there is shown an optical transmission line 11, hereinafter called trunk, located between terminal stations 13 and 14 and a branching line 12, hereinafter called branch, for adding one or more wavelengths to the trunk 11.

It is to be noted that FIG. 2 represents a simplification of the function of one direction of transmission of a branching unit. In general, a WDM branching unit contains components (not shown in the figure) by which a spectral area of the trunk WDM signals is removed and directed into a drop-branch as well as elements which allow the addition of the signals coming from an add-branch to the trunk.

Thus, the simplified arrangement of FIG. 2 only illustrates those parts of the functionality of a branching unit, which are relevant for a better understanding of this embodiment of the invention.

As shown in the FIG. 2, a first VOA, 15 is placed in the trunk 11 and a second VOA, 16 is located in the branch 12. The optical attenuation values of the two VOAs 15 and 16, are amplitude modulated by an appropriate periodic waveform at the same frequency but in phase difference, and preferably in anti-phase, the latter meaning a phase difference of 180° or, equivalently a time difference equal to half a period of the periodic waveform. Expressed in mathematical terms the subcarrier waveform, needs to satisfy as much as is practically possible the following relationship:

$$F(t) = -F\left(t + \frac{T}{2}\right)$$

where, F(t), is the subcarrier waveform and T, is the period of the subcarrier waveform. In other words the subcarrier waveform must be anti-symmetric with respect to the middle of the period.

The modulation indexes of the straight-through wavelength band, namely the optical signal traveling through the trunk 11 shown by arrow A, and the add-wavelength band in the branch 12 shown by arrow B, are made inversely proportional to their corresponding average optical powers.

More specifically the mathematical relationship describing the above requirement is the following:

$$\frac{P_{AVERAGE\_1}}{P_{AVERAGE\_2}} = \frac{Modulation\_Index\_2}{Modulation\_Index\_1}$$

Where $P_{AVERAGE\_1}$ and $P_{AVERAGE\_2}$ refer respectively to the power of the spectral areas corresponding to arrows A and B, modulated in phase difference or in anti-phase, after they have been combined in the trunk fiber 11 at the output of the branching unit. Modulation_Index_1 and Modulation_Index_2 refer respectively to the amplitude modulation indexes of the spectral areas corresponding to arrows A and B, modulated in phase difference or in anti-phase.

The result is that the amplitude modulation index of the optical power in the trunk 11, where the add and straight-through wavelength bands are combined, is the sum of the two signals in phase difference giving rise to the subtraction of one amplitude from the other due to the phase difference. The phase difference of the two modulated signals is chosen in a such a manner that the combined signal obtains an amplitude modulation index which is maintained at a minimum value.

Preferably, the two signals A and B are in anti-phase. As a result, the amplitude modulation index of the resulting signal, shown by arrow C, becomes zero or negligible, subject to engineering tolerances.

Figure 3:
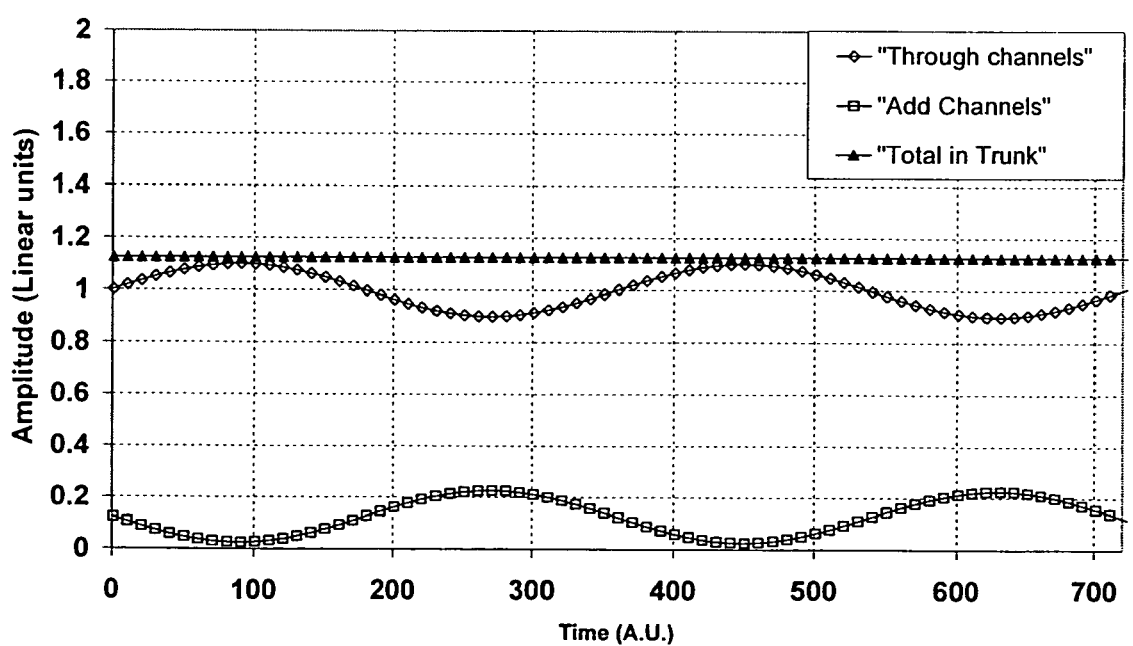
FIG. 3 is a graphical representation of the addition of the optical powers of two spectral bands that have been modulated with a sinusoidal supervisory signal subcarrier in anti-phase according to the alternative embodiment of FIG. 2.

FIG. 3 illustrates the addition of two sinusoidal waves, as an example of implementation of the embodiment of FIG. 2, with modulation indexes which are inversely proportional to their average powers with a ratio of 1 to 8. It can be observed that the resulting wave has no amplitude modulation. It is to be noted that the modulation indexes in FIG. 3 are in fact exaggerated in comparison to the values used in practice, only with the purpose of providing a clear illustration of the modulation scheme itself and it is in no way to be construed as a limiting feature of the present invention.

In this way no or negligible amplitude modulation is sensed by the amplifiers that may be present on the transmission line and thus there is a minimum impact on their gain, which is not perturbed by the passage of the supervisory signal. Therefore, the supervisory signaling cannot be attenuated by the passage through the EDFA line amplifiers in the trunk 11. This enables even low modulation frequency subcarriers launched at the branching unit to become accessible by the terminals on the trunk ends.

In order to determine the modulation index ratio for the two VOAs 15 and 16 of FIG. 2, optical power taps 17 and 18 may be used at appropriate points in the branching unit. In the example shown in FIG. 2, both taps 17 and 18 are located before the port of junction between the branch and the trunk. The optical power being tapped off the trunk line and the branch line is detected by optical PIN diodes and converted to electrical signal, which is input to the supervisory modulation control electronics. The optical power taps, 17 and 18, can thus be used to measure the optical powers of the add and the straight-through wavelengths which are used as indicative parameters for determining the modulation index.

In practice there are factors such as the difference between the optical path losses of the add and straight-through signals in the branching unit as well as other factors which can affect the relative powers of the add and straight through bands. These factors can be taken into account and calibrated out in the calculation of the required modulation indexes during the unit build stage. Furthermore, other power measuring schemes, such as using optical spectrum analyzing monitors or spectrally pre-filtered optical diodes on the combined WDM signal spectrum (i.e. on side of the signal shown by C in FIG. 2); as well as different relative positions of the taps 17, 18 in the topology may also be employed according to the specific requirements for each application, all of which falling within the scope of the present invention. Once the supervisory signal reaches terminal 14, it can be recovered by tapping-off the WDM signal and filtering out either of the spectral bands or a single wavelength belonging to either of the two spectral bands of the signal, which are modulated in phase difference or in anti-phase. Then the supervisory information carried on this wavelength can be demodulated.

It is to be noted however that assuming that part or parts of the signal traveling on the trunk 11 will be dropped in a subsequent branching unit in the trunk 11, there will be a progressive change from minimum or zero modulation amplitude condition depending on the number of wavelengths dropped and added at each branching unit as well as the number of branching units. Nevertheless, when a small proportion of the trunk signal wavelengths are dropped at each branching unit the proposed supervisory scheme will still be able to transmit the supervisory modulation much further than a one-modulation phase (single-VOA) low frequency scheme. This is because the line amplifiers' filtering response is proportional the total signal modulation index which can be maintained smaller than the individual spectral band modulation index by using the phase difference or anti-phase modulation schemes.

It would also be possible to adjust the total signal modulation index produced at the supervisory signaling branching unit to values other than zero to take into account the add-drop scheme of the whole network. The adjustment may be performed in such way that the product: (total signal modulation index)×(traversed path length) is always maintained at a minimum.

The invention claimed is:

1. A system for modulating a supervisory signal in an optical network, said network comprising at least one optical transmission line for transmitting an optical signal between a first and a second terminal as well as for transmitting a supervisory signal to at least one of said terminals wherein said supervisory signal is amplitude modulated by means of at least one variable optical attenuator located on said transmission line,
   wherein a first variable optical attenuator is adapted for performing amplitude modulation on a first spectral band of said supervisory signal and a second variable optical attenuator is adapted for performing amplitude modulation on a second spectral band of said supervisory signal such that the modulation of said first spectral band is at a same frequency and in phase difference relative to the modulation of said second spectral band, said first and second spectral band forming a combined signal having an amplitude modulation index at a predetermined value.

2. The system according to claim 1, wherein the modulated supervisory signal is superimposed on the optical signal transmitted by the optical transmission line.

3. The system according to claim 1 wherein the phase difference is chosen such that said predetermined value is a minimized.

4. The system according to claim 1 wherein said predetermined value is zero.

5. The system according to claim 1, wherein, one of said at least two variable optical attenuators is in a trunk line and another one of said variable optical attenuators is in a branching line of a branching unit.

6. The system according to claim 1, wherein the supervisory signal is amplitude modulated by a periodic waveform having the same frequency and a different phase.

7. A method for modulating a supervisory signal in an optical network, said network comprising at least one optical transmission line for transmitting an optical signal between a first and a second terminal as well as for transmitting a supervisory signal to at least one of said terminals, the method comprising:
   amplitude modulating said supervisory signal by means of at least one variable optical attenuator located on said transmission line,
   amplitude modulating a first spectral band of said supervisory signal by means of a first variable optical attenuator,
   amplitude modulating a second spectral band of said supervisory signal by means of a second variable optical attenuator such that said first spectral band is amplitude modulated relative to the modulation of said second spectral band at a same frequency and in phase difference, and
   combining said first and second spectral bands thus forming a combined signal having an amplitude modulation index at a predetermined value.

8. The method according to claim 7, further comprising:
   superimposing the modulated supervisory signal on the optical signal transmitted by the optical transmission line.

9. The method according to claim 7 wherein the phase difference is chosen such that said predetermined value is minimized.

10. The method according to claim 7 wherein said predetermined value is zero.

11. The method according to claim 7, wherein, at least one of said first or second spectral band of said supervisory signal is modulated in a trunk line and another one of said first or second spectral band of said supervisory signal is modulated in a branching line of a branching unit.

* * * * *